United States Patent [19]
Ilešič

[11] Patent Number: 5,639,102
[45] Date of Patent: Jun. 17, 1997

[54] SEAL ARRANGEMENT FOR SEALING A CONDUIT

[76] Inventor: Peter Ilešič, Erjavčeva 18, 62000 Maribor, Slovenia

[21] Appl. No.: 704,236

[22] Filed: Aug. 28, 1996

Related U.S. Application Data

[63] Continuation of Ser. No. 352,064, Nov. 30, 1994, abandoned.

[30] Foreign Application Priority Data

Dec. 2, 1993 [DE] Germany ............... 43 41 133.9
Mar. 15, 1994 [DE] Germany ............... 44 08 743.8

[51] Int. Cl.⁶ ................................................. F16J 9/00
[52] U.S. Cl. .................. 277/207 A; 277/101; 277/152; 285/111
[58] Field of Search ................... 277/207 A, 208, 277/210, 152, 101, 27, 63; 285/111, 112

[56] References Cited

U.S. PATENT DOCUMENTS

| | | |
|---|---|---|
| 1,833,776 | 11/1931 | Dillon . |
| 2,184,376 | 12/1939 | Beyer et al. ............... 277/101 |
| 2,424,542 | 7/1947 | Adams . |
| 3,179,446 | 4/1965 | Paterson ..................... 277/101 |
| 3,249,685 | 5/1966 | Heglin, Jr. ............... 277/207 A |
| 3,430,989 | 3/1969 | Wendt ..................... 277/207 A |
| 3,573,871 | 4/1971 | Warner ...................... 277/208 |
| 3,877,733 | 4/1975 | Straub ...................... 285/112 |
| 4,097,076 | 6/1978 | Wackenreuther et al. ..... 285/111 |
| 4,343,480 | 8/1982 | Vassallo .................. 277/207 A |
| 4,893,843 | 1/1990 | DeRaymond ............... 277/206 R |
| 5,230,536 | 7/1993 | Newman ..................... 285/112 |

FOREIGN PATENT DOCUMENTS

| | | |
|---|---|---|
| 0550676 | 12/1959 | Belgium .................. 285/112 |
| 0180824 | 5/1986 | European Pat. Off. . |
| 0288993 | 11/1988 | European Pat. Off. . |
| 2471542 | 6/1981 | France . |
| 0505671 | 4/1956 | Italy ..................... 285/112 |
| 566508 | 9/1975 | Switzerland . |
| 2186651A | 8/1987 | United Kingdom . |

*Primary Examiner*—Daniel G. DePumpo
*Attorney, Agent, or Firm*—Cushman Darby & Cushman, IP Group of Pillsbury Madison & Sutro LLP

[57] ABSTRACT

A sealing arrangement for sealing a conduit for a gaseous or liquid agent includes a closable housing which fits sleeve-like around the conduit. A sealing member comprising elastomer material is arranged in the housing in an annular configuration therein and has an annular bead which projects towards the wall of the conduit. The bead has a sealing surface to be applied against the wall. The sealing member has an annular gap which subdivides the annular bead in the axial direction of the arrangement into a first radial bead portion at the inward side of the seal and a second radial bead portion at the outward side of the seal. The gap extends from the sealing surface into the annular bead at such an inclination that an acute-angled sealing lip is formed on the second bead portion adjoining the gap. At the inward side of the seal the first bead portion can have an axially facing annular groove of an undercut configuration which on the first bead portion forms an acute-angled sealing lip which is directed inwardly of the seal.

15 Claims, 1 Drawing Sheet

SEAL ARRANGEMENT FOR SEALING A CONDUIT

This is a continuation of application Ser. No. 08/352,064, filed on Nov. 30, 1994, which was abandoned.

BACKGROUND OF THE INVENTION

One form of sealing arrangement for sealing a conduit for carrying a fluid, that is to say a gaseous or liquid agent includes a closable housing which, in an opened and slackened condition, is fitted with an annular sealing member therein around the conduit or pipe which is to be sealed off. The sealing member of elastomer material has an annular bead affording a sealing surface for cooperating with the wall surface of the conduit. By tightening the housing, the annular bead of the sealing member is moved radially towards the outside of the wall of the conduit until the sealing surface of the annular bead presses against the wall of the conduit, with the required contact pressure force or sealing force. If the gaseous or liquid agent contained in the conduit is subjected to different operating pressures, that is to say a reduced pressure or an increased pressure, the contact pressure force with which the annular bead bears against the wall of the conduit must be adapted and adjusted for the respective differences in pressure and thus force, at the sealing surface, as between the space which is under pressure and the surrounding atmosphere. If an excessively low contact pressure force is applied, the seal my lose sealing integrity when the internal pressure is increased, as the annular bead which for example is of a configuration in the form of a circular arc lifts away from the wall of the conduit. It will therefore be necessary as a precaution to apply an increased contact pressure force in order to be sure of affording an adequate sealing effect, even in regard to the maximum differences in pressure and force which are likely to occur in the sealing region.

When using thin-wall pipes or conduits however, in consideration of the limited strength thereof, the contact pressure force to be applied by the seal my not exceed a comparatively low value which is dependent on the strength of the conduits. That limitation on the contact pressure force to be applied is to be taken into consideration in particular when dealing with pipes of plastic material of lower strength than pipes of metal. However, as stated, that contact pressure force which is admissible only to a limited extent can result in an inadequate sealing effect, in particular when the situation involves fluctuating pressures which cause the seal to be 'worked', that is to say the seal performs micro-movements in the elastic range, and when the situation involves a low pressure or a reduced pressure in respect of the agent, when difficulties occur in terms of providing a sealing effect with conventional sealing arrangements.

SUMMARY OF THE INVENTION

An object of the present invention is to provide a sealing arrangement for a conduit for a gaseous or liquid medium, which permits a universal and durable sealing action for conduits of different materials and strengths, both at low conduit pressures and at high conduit pressures and also when a conduit join is subjected to a high level of leading.

Another object of the invention is a sealing arrangement for a conduit for carrying a fluid therein, which affords a sealing effect of enhanced reliability and adaptability to varying operational circumstances while nonetheless being of relatively simple structural configuration.

In accordance with the present invention the foregoing and other objects are attained by a sealing arrangement for sealing a conduit for a fluid, that is to say a gaseous or liquid agent, including a closable housing adapted to fit sleeve-like around the conduit, and a sealing member of elastomer material and arranged in the housing in an annular configuration. The sealing member has an annular bead arranged to project towards the conduit and having a sealing surface adapted to bear against the surface of the conduit. The sealing member has an annular gap which subdivides the annular bead in the axial direction of the arrangement into a first radial bead portion at the inward side of the seal and a second radial bead portion at the outward side of the seal. The gap extends from the sealing surface into the annular bead at such an inclination that an acute-angled sealing lip is formed on the second bead portion adjoining the gap.

As will become apparent from the following description of a preferred embodiment, when the sealing arrangement is fixed to a conduit, for example at a point on a pipe which is suffering from a leak or at the location of a conduit join, the sealing surface of the first bead portion is caused to bear against the wall of the conduit when the housing is tightened, so as to form a first sealing means. The sealing surface is of an axially enlarged length thereby forming a widened sealing region so that the bead portion applies a low contact pressure force which loads the wall of the conduit to an admissible degree but which is still sufficient to provide a first, inner sealing action. By virtue of the inclined gap which is arranged at an angle relative to the longitudinal axis of the conduit, when the sealing arrangement is tightened the first bead portion presses against the sealing lip of the second bead portion, whereby the sealing lip is caused to bear firmly against the wall of the conduit and forms an additional outer second sealing means, the sealing action of which is improved by the inwardly directed sealing lip. In that way it is also possible reliably to seal off conduits in which the agent therein is under a low pressure.

As, when the arrangement according to the invention is used at a pipe join, the annular bead which provides the sealing action is not disposed in the region of action of the conduit forces (axial movement or torsional movement), but bears against the peripheral surface of the conduit and is pressed against it there with a controlled force, the sealing arrangement remains durably elastic by virtue of a low level of mechanical loading. In relation to pipe joins, there is no need for the pipe ends to precisely butt together and the pipe ends do not have to be especially machined as the sealing member of the arrangement according to the invention has a good sealing effect both on a rough surface and also on a smooth surface.

In a preferred feature the first bead portion has an axially facing annular groove in the form of an undercut configuration, on its side which is the inward side as considered in the axial direction, that is to say, on that side of a cavity in the sealing arrangement, which is towards the agent that is present in the conduit and that is to be sealed off relative to the surrounding atmosphere. The undercut configuration thus forms a pronounced, projecting sealing lip which converges at an acute angle. If, upon an increase in the pressure in the conduit, the pressure in the space or cavity in the sealing arrangement also increases proportionally, then pressing against the undercut configuration on the first bead portion, then on the one hand the projecting sealing lip is pressed substantially radially against the wall surface of the conduit while on the other hand the first bead portion is deformed substantially in the axial direction. That deformation, by way of the compressed gap, presses inclinedly against the second bead portion whereby the latter presses against the wall of the conduit with an increased contact pressure force and forms an additional sealing effect which is proportional to the increased pressure and which affords a progressive sealing action.

The sealing member may have a transitional region of a recessed configuration, which adjoins the undercut configuration of the first bead portion in a direction towards the region of the sealing member which is for example of a cylindrical shape. The first bead portion can then deform more easily with a radial component as its elasticity of deformation is improved by weakening of its base in the transitional region.

In a further preferred feature, the sealing lip of the second bead portion may be arranged displaced outwardly in a radial direction relative to the sealing surface of the first bead portion. When the sealing arrangement is tightened the sealing surface of the first bead portion then bears first against the wall of the conduit. It is thereafter that the sealing lip of the second bead portion bears against the wall of the conduit so that it cannot push itself under the sealing surface of the first bead portion. That arrangement results in the sealing lip being in a defined position on the wall of the conduit, and that defined position, upon an increase in pressure, results in a more uniform seal being produced, with an improved sealing action, even in relation to rough or uneven surfaces.

In a preferred feature of the invention the sealing surface of the outer second bead portion may be divided into an axially inclined sealing surface and a sealing surface which extends parallel to the axis of the arrangement. When then the sealing arrangement is tightened in position, the contact pressure force in the inclined sealing surface rises approximately linearly while the sealing surface which is parallel to the axis of the arrangement bears against the wall of the conduit only slightly with a negligible contact pressure force or without any force. Accordingly, it is only necessary to apply the minimum required contact pressure force which loads the conduit with a minimum amount of pressure in relation to surface area, without causing deformation of the conduit.

Preferably the sealing member is of a mirror-image symmetrical configuration in the axial direction. In that case the sealing member can be used in a particularly desirable fashion by virtue of the bead portions bearing against a pipe connection at both sides thereof, as the same sealing conditions occur at the two bead portions. That therefore gives a seal which is resistant to shock and impact as well as vibration and shaking or jarring and which particularly in the case of gas conduits affords an enhanced level of safeguard against fire and explosion, as is indispensable for example in areas which are liable to earthquakes.

Preferably the sealing member is fitted into the housing loosely or with a snug or press fit involving a relatively low insertion force. In that case, when the housing is closed or upon movements in respect of the ends of the conduit, the sealing member can move slightly at its periphery relative to the housing so that no stresses are built up in the sealing member, which could restrict the sealing action. The application of a lubricant or slip agent to the outer periphery of the sealing member and/or the inner periphery of the housing can further reduce undesired friction which could impede the compensating movement.

Further objects, features and advantages of the invention will be apparent from the following description of a preferred embodiment.

DESCRIPTION OF THE PREFERRED EMBODIMENT

Figure 1:
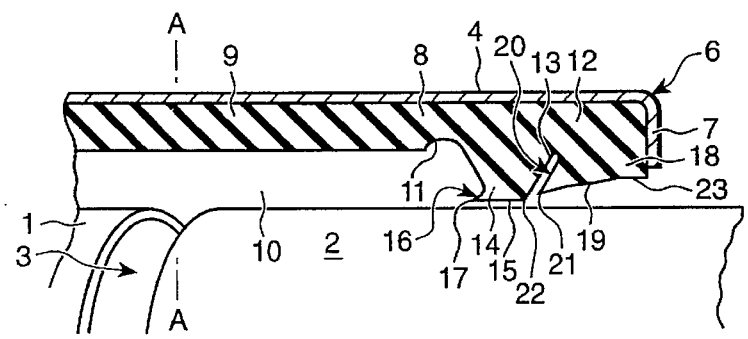
FIG. 1 is a diagrammatic sectional view of a sealing arrangement according to the invention, surrounding a pipe joint.

Referring to FIG. 1, shown therein is a pipe connection between two pipes 1 and 2 which together constitute a conduit. The pipes 1 and 2 adjoin each other with their respective open ends which face towards each other. They can be fitted together with a gap 3 or in butting relationship without a gap or only with a small gap. Likewise the pipe connection can be formed in any other suitable manner, for example by screwing or by the pipe ends being fitted one into the other (not shown). A simple connection of that kind is not gas-tight or fluid-tight so that leakages can occur due to escape of the fluid agent, that is to say a gaseous or liquid medium, contained in the conduit.

The drawings show the pipe connection with a gap 3 in order clearly to indicate the possibility of the agent in the conduit escaping therefrom. The sealing arrangement which is designed symmetrically relative to a line or cross-sectional area as indicated at A—A in FIG. 1 is only shown in the drawings with its middle region and its right-hand half. The specific embodiment described hereinafter is described with reference to the geometry in relation to a sectional view, but it will be appreciated that it is intended to relate to a rotationally symmetrical sealing arrangement.

The sealing arrangement for sealing the conduit comprises a housing 4 of a substantially rotationally symmetrical configuration in the manner of a sleeve or a pipe clamp and provided with a mechanical closure device (not shown) so that it can be fixed to a pipe or conduit by embracing around same in a sleeve-like manner. In the initially slack or loosened condition the housing 4 is arranged approximately centrally over the pipe connection, that is to say over the gap 3. The two axial ends 6 of the housing 4 are then disposed over the end regions of the pipes 1 and 2. At each of its ends 6 the housing 4 has a radially inwardly extending terminal wall 7.

Fitted in the interior of the housing 4 is a rotationally symmetrical, annular sealing member 8 of elastomer material which is in the form of a sleeve member. The sealing member 8 bears with its outside against the inside periphery of the housing 4. Before the sealing member 8 is fitted into the housing 4, a lubricant paste or a similar lubricating material can be applied to the outside of the sealing member 8 or the inside of the housing 4.

Figure 2:
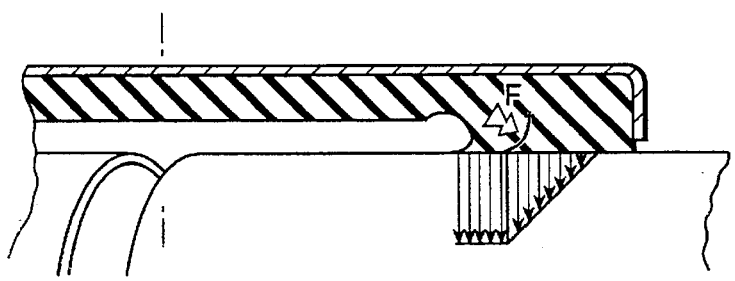
FIG. 2 shows the sealing arrangement of FIG. 1 in the tightened condition with the resulting radial pressure force pattern at the sealing surface of the sealing arrangement.

In the present description of the sealing arrangement the term inside diameter or the term inside radius denotes the inside dimension of the sealing member 8 at a respective cross-section. In a first middle region 9 which engages over the connection between the pipes 1 and 2, the sealing member 8 is of an inside diameter which is larger than the outside diameter of the pipes 1 and 2 so that a substantially annular cavity 10 remains on the inward side of the seal, between the middle region 9 of the sealing member 8 and the outside walls or surfaces of the pipes 1 and 2, even when the housing 4 is in the tightened condition, as shown in FIG. 2.

Adjoining the middle region 9 in the axial direction is a transitional region 11 which is of larger inside diameter than the middle region 9 of the sealing member. That transitional region 11 can be in the form of an annular groove with inclined or bevelled side walls or of a cross-section in the form of a circular arc or similar shape. The transitional region 11 goes into a sealing annular bead 12 of smaller inside diameter which is subdivided into two bead portions, more specifically the first and second radial bead portions 14 and 18, respectively, by a recess in the form of a narrow slot-like groove or annular gap 13.

The first radial bead portion 14 adjoins the transitional region 11 in the axial direction. The radial bead portion 14 has a sealing surface 15 which extends substantially parallel to the surface of the conduit, in an axial direction, to the gap 13. Provided on the first radial bead portion 14, towards the transitional region 11, is an axial groove in the form of an undercut configuration 16 which, in a direction towards the pipe 2, goes into the sealing surface 15 of the radial bead portion 14, that configuration forming a projecting, acute-angled inner sealing lip 17 which faces approximately axially inwardly towards the pipe connection.

When considered axially, that is to say when viewing towards the right in FIG. 1, the gap 13 extends at an obtuse angle which can be for example between about 110° and 130° from the sealing surface 15 of the first radial bead portion 14 into the interior of the sealing member 8 or the annular bead 12. The greatest depth or the greatest diameter of the gap 13 approximately corresponds to the inside diameter of the middle region 9 of the sealing member 8.

The axially adjoining region of the sealing member 8, which extends from the gap 13 to the terminal wall 7 of the housing 4, forms the second radial bead portion 18. The second radial bead portion 18 has a first sealing surface 19 which, with the side wall 20 of the radial bead portion 18 which is defined by the gap 13, forms an outer sealing lip 21 which converges at an acute angle. The inside diameter defined by the front edge of the outer sealing lip 21 is larger than the diameter of the adjacent outer edge 22 of the radial bead portion 14, said edge 22 being formed as the boundary line between the sealing surface 15 of the radial bead portion 14 and the gap 13. The first sealing surface 19 extends with an enlarging diameter in the axial direction and goes into a second sealing surface 23 which extends with a substantially constant diameter as far as the terminal wall 7 of the housing 4.

The sealing member 8 is of mirror-image symmetrical configuration and at its left-hand end region (not shown) has an annular bead corresponding to the annular bead 12, in a mirror-image symmetrical arrangement.

For clamping the sealing arrangement in position, the housing 4 is tightened for example by a screw closure (not shown) so that the housing 4 is pressed in a radial direction against the pipe 2 and against the pipe 1, the radial bead portion 14 bearing with its sealing surface 15 against the pipe 2. By the housing 4 being further tightened, the radial bead portion 14 is radially compressed, with elastic deformation of its rubber-like or springy material, in which case its side surface which is towards the gap 13 fills the gap 13, comes to bear against the side wall 20 of the second radial bead portion 18 and presses against the side wall 20. The housing 14 is radially tightened until the second sealing surface 23 of the radial bead portion 18 bears against the pipe 2 without any pressure or with a slight pressure. The side region of the radial bead portion 14, which is towards the gap 13, then also presses against the second radial bead portion 18 and the outer sealing lip 21, thus resulting in the sealing member 8 being in the clamped condition shown in FIG. 2 with the pressure pattern at the sealing surfaces 15, 19 and 23, which arises by virtue of the specific geometry of the radial bead portions 14 and 18. In the operation of tightening the sealing arrangement therefore the arrangement produces a dual sealing action, insofar as on the one hand the sealing surface 15 of the radial bead portion 14 and the sealing surface 19 of the radial bead portion 18 press against the pipe 2, and on the other hand the radial bead portion 14, filling the gap 13, additionally presses against the radial bead portion 18 and in particular the outer sealing lip 21 thereof and thus produces a second sealing effect. That affords a reliable fine, delicate sealing action even in relation to a low pressure in the conduit and in relation to vacuum if only a low contact pressure force is applied at the annular bead 12.

Figure 3:
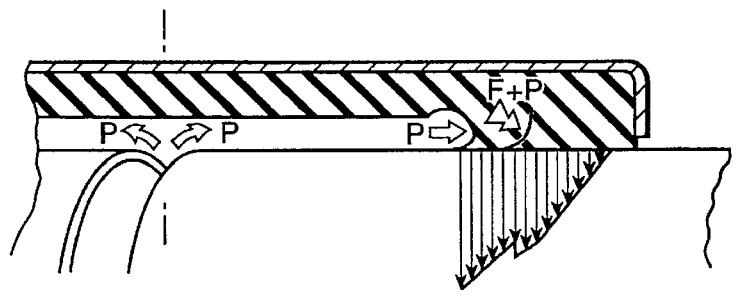
FIG. 3 is a diagrammatic sectional view of the sealing arrangement in the case of a rising pressure in the conduit, with the resulting radial pressure force pattern at the sealing surface of the sealing arrangement.
Figure 4:
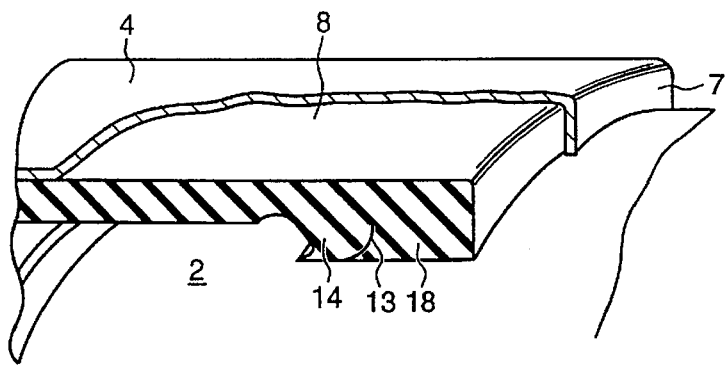
FIG. 4 is a perspective view of the partially sectioned housing with the sealing arrangement in the tightened condition.

If the pressure as indicated at p in FIG. 3 of the agent in the conduit rises, the pressure in the cavity 10 also increases proportionally. That pressure p applies a force to the side of the radial bead portion 14, which is towards the cavity 10, constituted by the transitional region 11 and the undercut configuration 16, so that the sealing sealing lip 17 and the sealing surface 15 are additionally pressed against the surface of the pipe 2 by the above-described elastic deformation of the radial bead portion 14. Therefore, by virtue of the undercut configuration, the radial bead portion 14 can also be deformed radially against the pipe 2, upon an increase in the pressure in the agent in the conduit and thus an increase in the pressure in the cavity 10. The pressure p also results in additional deformation or curvature of the radial bead portion 14 in the axial direction so that it presses against the radial bead portion 18 and in particular the outer sealing lip 21 thereof and thus results in an increase in the contact pressure force applied by the sealing member 8 with its annular bead 12 against the pipe 2. The resulting pressure pattern at the sealing surfaces 15, 19 and 23 is diagrammatically shown in FIG. 3, in which reference F, in the direction indicated by the arrow, denotes the force produced by the clamping action of the sealing arrangement, in the sealing annular bead 12, while p denotes the force produced by the rising pressure. Thus, with a low initial pressure in the conduit, it may be sufficient to have a low contact pressure force which does not have to be designed for a maximum pressure and which therefore applies only a low loading to the wall of the conduit, while with an increasing pressure the contact pressure force or the sealing force is increased concomitantly therewith.

The housing 4 of the sealing arrangement as well as the closure members and clamping screws preferably comprise metal, more especially high-quality stainless steel.

The sealing member or sealing sleeve 8 comprises synthetic rubber which is selected in dependence on the respective agent involved. Thus an EPDM-rubber (ethylene-propylene-diene elastomer) is suitable for all qualities of water, for waste water or sewage, air, solids and chemical products, while an NBR-rubber (acrylonitrile-butadiene elastomer) is used in relation to gas, oil, fuels and propellants and other hydrocarbons.

As described, the sealing arrangement can be used for sealing off a connection between two pipes of a conduit, which are to be joined together. In that case the two pipes can be fixed in their mutual positions by holding means so that the sealing arrangement is essentially restricted to the function of providing a selling action.

The sealing arrangement however may also perform the function of holding the ends of the pipes 1 and 2, for example in relation to freely laid waste water or sewage pipes, in which case it then holds the ends of the pipes in mutually centered relationship.

The sealing arrangement according to the invention can bridge over and seal off both a leaky point in a pipe or conduit and also a narrow or wide gap between the ends of adjoining pipe portions of a pipe join so that the sealing arrangement can be used as a length-compensating means. The sealing arrangement is also suitable when the axes of the end portions of the adjoining pipes are displaced in a radial direction, when the ends of the pipe portions are angularly displaced, and when the ends of the pipe portions involve a rotational movement in opposite relationship, as well as in relation to different pipe diameters.

The sealing arrangement can be used with many pipe materials. Thus the pipes may comprise steel, including longitudinally welded or spiral-welded, non-ferrous metal such as aluminium, copper and alloys thereof, plastic material such as PE, PP, PVC, ABS, or glass fiber-reinforced plastic (GRP), or other materials such as, glass, fiber cement or ceramic.

The housing 4 and the sealing member 8 may be designed to be divided in a longitudinal plane at one half thereof or continuously so that the sealing arrangement can be completely divided or can be pivoted about a hinge disposed on the housing. In that case the sealing arrangement is particularly easy to fit as the pipes which are to be sealed thereby do not have to be separated from each other. In particular the sealing arrangement can be used as a repair assembly on a leaking pipe.

If the plane of division or separation which passed through the longitudinal axis of the sealing arrangement is displaced through an angle relative to the longitudinal axis, between the two radial bead portions 14 and 18, that avoids the existence of a rectilinear continuous separating gap in the region of the annular bead 12. That means that the improved sealing action is still retained.

The sealing member which has been described in relation to a rotationally symmetrical sealing arrangement can also be of a horizontal, flat configuration, in which case the geometries of the radial bead portions are transferred to a flat sealing arrangement.

It will be appreciated that the above-described embodiment of the invention has been set forth only by way of example and illustration of the invention and that various other modifications and alterations may be made therein without thereby departing from the spirit and scope of the invention.

What is claimed is:

1. A sealing arrangement for sealing a joint in a fluid carrying conduit comprising:
    a closable housing mounted in a sleeve-like manner around said conduit so as to cover the joint; and
    a sealing member comprising elastomer material and arranged in said housing in an annular configuration, said sealing member including:
        an axially extending middle region disposed in a radially spaced relation with respect to a wall of the conduit so as to define a cavity between said middle region and the wall; and
        an annular bead projecting towards the wall of said conduit to be sealed, said annular bead having an inside diameter that is smaller than an inside diameter of said middle region so as to prevent said middle region from contacting the wall when said housing is closably tightened around said sealing member and the conduit, said annular bead further having a sealing surface adapted to be applied against said wall, said sealing member having an annular gap formed therein which subdivides the annular bead in an axial direction into a first radial bead portion positioned axially inwardly of said annular gap and a second radial bead portion positioned axially outwardly of said annular gap, said annular gap having inner and outer sidewalls which define, respectively, an outer wall of said first radial bead portion and an inner wall of said second radial bead portion, said annular gap being formed at an angle with respect to said conduit so as to define an acute angled outer sealing lip on said second radial bead portion,
    wherein, when said housing is closably tightened around said sealing member and the conduit, said first radial bead portion deforms elastically under a compressive force applied by said housing to close said annular gap such that said outer wall of said first radial bead portion bears against said inner wall of said second radial bead portion so as to force said outer sealing lip into sealing contact with the wall of the conduit with any portion of the fluid within the conduit passing through the joint filling said cavity and exerting pressure on said first radial bead portion so as to further source said outer sealing lip into sealing contact with the wall.

2. A sealing arrangement as set forth in claim 1 wherein at an axially inward side of said annular bead, the first radial bead portion has an axially facing annular groove of an undercut configuration which on the first radial bead portion forms an acute-angled inner sealing lip directed axially inwardly of the annular bead.

3. A sealing arrangement as set forth in claim 1 wherein the sealing member has a recessed transitional region which adjoins said undercut configuration of the first radial bead portion.

4. A sealing arrangement as set forth in claim 1 wherein said sealing surface is disposed on said first radial bead portion and wherein a front edge of the outer sealing lip is displaced radially outwardly relative to the sealing surface.

5. A sealing arrangement as set forth in claim 1 wherein said housing has an outer terminal wall and wherein the second radial bead portion has a first sealing surface which is inclined in the axial direction of the sealing arrangement and which expands radially and a second sealing surface which adjoins the first sealing surface and which extends in the axial direction of the sealing arrangement substantially with a constant diameter to said outer terminal wall of the housing.

6. A sealing arrangement as set forth in claim 1 wherein said sealing member has two axial edge regions and wherein at each of the two axial edge regions the sealing member has a respective annular bead, the two annular beads being of a mirror-image symmetrical configuration relative to each other.

7. A sealing arrangement as set forth in claim 1 including a clamping means on the housing at its outer periphery for clamping the housing on the conduit.

8. A sealing arrangement as set forth in claim 1 wherein the sealing member is a loose fit in the housing.

9. A sealing arrangement as set forth in claim 1 wherein the sealing member is a snug fit in the housing.

10. A sealing arrangement as set forth in claim 1 including a friction-reducing means applied to the outer periphery of the sealing member.

11. A sealing arrangement as set forth in claim 1 including a friction-reducing means applied to the inner periphery of the housing.

12. A sealing arrangement as set forth in claim 1 wherein the elastomer material of the sealing member is an ethylene-propylene-diene elastomer.

13. A sealing arrangement as set forth in claim 1 wherein the elastomer material of the sealing member is an acrylonitrile butadiene elastomer.

14. A sealing arrangement as in claim 1 wherein said first radial bead portion expands elastically in opposite axial directions.

15. A sealing arrangement for sealing to a surface, said sealing arrangement comprising: an elongate housing, means for fitting the housing to said surface, and a sealing member comprising elastomer material and arranged in the housing, the sealing member including a longitudinally extending middle region disposed in a radially spaced relation with respect to the surface so as to define a cavity between said middle region and the surface and a projection which is adapted to project towards said surface in the fitted condition of said housing and which has a sealing surface adapted to be applied against said surface, said projection having an inside dimension that is smaller than an inside dimension of said middle region so as to prevent said middle region from contacting the surface when said housing is in the fitted condition, the sealing member having a gap which subdivides said projection in the longitudinal direction of the housing into a first projection portion at the inward side of the gap and a second projection portion at the outward side of the gap, the gap extending from the sealing surface into the projection at such an inclination that an acute-angled sealing lip is formed on the second projection portion adjoining the gap, said first projection elastically deforming to close said gap when said fitting means closably tightens said housing to said surface so as force said acute-angled sealing lip into sealing contact with the surface with any fluid escaping through an opening in the surface within the middle region filling said cavity and exerting pressure on an interior surface of said first projection so as to further force said acute-angled sealing lip into sealing contact with the surface.

* * * * *